(12) United States Patent
Zettl et al.

(10) Patent No.: US 7,453,183 B2
(45) Date of Patent: Nov. 18, 2008

(54) ROTATIONAL ACTUATOR OF MOTOR BASED ON CARBON NANOTUBES

(75) Inventors: Alexander K. Zettl, Kensington, CA (US); Adam M. Fennimore, Berkeley, CA (US); Thomas D. Yuzvinsky, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/383,904

(22) Filed: May 17, 2006

(65) Prior Publication Data
US 2007/0114880 A1 May 24, 2007

Related U.S. Application Data

(62) Division of application No. 10/891,615, filed on Jul. 15, 2004, now Pat. No. 7,053,520.

(60) Provisional application No. 60/488,485, filed on Jul. 18, 2003.

(51) Int. Cl.
H02N 1/00 (2006.01)
(52) U.S. Cl. ........................ 310/309; 977/725
(58) Field of Classification Search ................. 310/309; 318/116; 359/223–226, 290; 977/725, 733, 977/752; 417/432.1
See application file for complete search history.

(56) References Cited

U.S. PATENT DOCUMENTS

| 5,641,466 | A |   | 6/1997  | Ebbesen et al. ........... 423/447.2 |
| 5,959,760 | A | * | 9/1999  | Yamada et al. .............. 359/224 |
| 5,993,697 | A |   | 11/1999 | Cohen et al. ................ 252/502 |
| 6,063,243 | A |   | 5/2000  | Zettl et al. .................. 204/164 |
| 6,231,980 | B1|   | 5/2001  | Cohen et al. ................ 428/402 |
| 6,538,262 | B1|   | 3/2003  | Crespi et al. ................. 257/40 |
| 6,555,945 | B1|   | 4/2003  | Baughman et al. .......... 310/300 |
| 6,582,673 | B1|   | 6/2003  | Chow et al. ............. 423/445 R |

(Continued)

FOREIGN PATENT DOCUMENTS

JP    2003-211396    7/2003

OTHER PUBLICATIONS

Craighead, "Nanoelectromechanical Systems", Science, Nov. 24, 2000, vol. 290, No. 5496, pp. 1532-1535.*

(Continued)

Primary Examiner—Karl I Tamai
(74) Attorney, Agent, or Firm—Lawrence Berkeley National Laboratory; Robin Chen Chiang; R'Sue Popowich Caron

(57) ABSTRACT

A rotational actuator/motor based on rotation of a carbon nanotube is disclosed. The carbon nanotube is provided with a rotor plate attached to an outer wall, which moves relative to an inner wall of the nanotube. After deposit of a nanotube on a silicon chip substrate, the entire structure may be fabricated by lithography using selected techniques adapted from silicon manufacturing technology. The structures to be fabricated may comprise a multiwall carbon nanotube (MWNT), two in plane stators S1, S2 and a gate stator S3 buried beneath the substrate surface. The MWNT is suspended between two anchor pads and comprises a rotator attached to an outer wall and arranged to move in response to electromagnetic inputs. The substrate is etched away to allow the rotor to freely rotate. Rotation may be either in a reciprocal or fully rotatable manner.

41 Claims, 5 Drawing Sheets

U.S. PATENT DOCUMENTS

| | | | |
|---|---|---|---|
| 6,593,677 B2 | 7/2003 | Behin et al. | 310/309 |
| 6,626,684 B1 | 9/2003 | Stickler et al. | 439/87 |
| 6,628,053 B1 | 9/2003 | Den et al. | 313/310 |
| 6,636,050 B2 | 10/2003 | Nakayama et al. | 324/537 |
| 6,652,148 B2 | 11/2003 | Iso et al. | 384/462 |
| 6,682,677 B2 | 1/2004 | Lobovsky et al. | 264/172.11 |
| 6,709,566 B2 | 3/2004 | Cumings et al. | 205/641 |
| 6,756,795 B2 | 6/2004 | Hunt et al. | 324/701 |
| 6,803,840 B2 | 10/2004 | Hunt et al. | 333/186 |
| 6,828,966 B1 | 12/2004 | Gavriliu et al. | 345/420 |
| 6,835,591 B2 | 12/2004 | Rueckes et al. | 438/99 |
| 6,835,952 B2 | 12/2004 | Crespi et al. | 257/40 |
| 6,870,300 B2 | 3/2005 | Bolle et al. | 310/309 |
| 7,053,520 B2* | 5/2006 | Zetti et al. | 310/309 |
| 2001/0023021 A1 | 9/2001 | Cohen et al. | 428/402 |
| 2002/0053522 A1 | 5/2002 | Cumings et al. | 205/604 |
| 2002/0070426 A1 | 6/2002 | Cumings et al. | 257/613 |
| 2004/0110003 A1 | 6/2004 | Cumings et al. | 428/399 |
| 2004/0239210 A1 | 12/2004 | Pinkerton et al. | 310/309 |
| 2005/0017598 A1* | 1/2005 | Zettl et al. | 310/309 |

OTHER PUBLICATIONS

Cleland et al., "A Nanometer-Scale Mechanical Electrometer", Nature, vol. 392, Mar. 1998, pp. 160-162.*
Williams et al., "Torsional Response and Stiffening of Individual Multiwalled Carbon Nanotubes", Physical Review Letters, vol. 89, No. 25, Dec. 2002.*
Bockrath et al., "Single-Electron Transport in Ropes of Carbon Nanotubes", Science, vol. 275, p. 1922-1925, (Mar. 1997).
Carr et al., "Measurement of Mechanical Resonance and Losses in Nanometer Scale Silicon Wires", Applied Physics Letters, vol. 75(No. 7), p. 920-922, (Aug. 1999).
Charlier et al., "Energetics of Multilayered Carbon Tubules", Physical Review Letters, vol. 70 (No. 12), p. 1858-1861, (Mar. 1993).
Chopra et al., "Boron Nitride Nanotubes", Science, vol. 269, p. 966-967, (Aug. 1995).
Cleland et al., "A Nanometre-Scale Mechanical Electrometer", Nature, vol. 392, p. 160-162, (Mar. 1998).
Collins et al., "Engineering Carbon Nanotubes and Nanotube Circuits Using Electrical Breakdown", Science, vol. 292, p. 706-709, (Apr. 2001).
Craighead et al., "Nanoelectromechanical Systems", Science, vol. 290, p. 1532-1535, (Nov. 2000).
Cumings et al., "Low-Friction Nanoscale Linear Bearing Realized from Multiwall Carbon Nanotubes", Science, vol. 289, p. 602-604, (Jul. 2000).
Cumings et al., "Peeling and Sharpening Multiwall Nanotubes", Nature, vol. 406, p. 586, (Aug. 2000).
Ebbesen et al., "Large-Scale Synthesis of Carbon Nanotubes", Nature, vol. 358, pp. 220-222, (Jul. 1992).
Ekinci et al., "Ultimate Limits to Inertial Mass Sensing Based Upon Nanoelectromechanical Systems", Journal of Applied Physics, vol. 95 (No. 5), p. 2682-2689, (Mar. 2004).
Falvo et al., "Nanometre-Scale Rolling and Sliding of Carbon Nanotubes", Nature, vol. 397, p. 236-238, (Jan. 1999).
Fennimore et al., "Rotational Actuators Based on Carbon Nanotubes", Nature, vol. 424, p. 408-410, (Jul. 2003).
Forro, "Beyond Gedanken Experiments", Science, vol. 289, p. 560-561, (Jul. 2000).
Fraysse et al., "Carbon Nanotubes Acting Like Actuators", Carbon, vol. 40, p. 1735-1739, (2002).
Fukada et al., "Assembly of Nanodevices with Carbon Nanotubes Through Nanorobotic Manipulations", Proceedings of the IEEE, vol. 91 (No. 11), p. 1803-1818, (Nov. 2003).
Iijima, "Helical Microtubules of Graphitic Carbon", Nature, vol. 354, p. 56-58, (Nov. 1991).
Jhaveri et al., "Isolation and Characterization of Trioxyethylene-Encapsulated Gold Nanoclusters Functionalizaed with a Single DNA Strand", Nano Letters, vol. 4 (No. 4), p. 737-740, (2004).
Judy, "Microelectromechanical Systems (MEMS): Fabrication, Design and Applications", Smart Materials and Structures, vol. 10, p. 1115-1134, (2001).
Jun et al., "Controlled Synthesis of Multi-Armed CdS Nanorod Architectures Using Monosurfactant System", Journal of the American Chemical Society, vol. 123, p. 5150-5151, (2001).
Kladitis et al., "Prototype Microrobots for Micro-Positioning and Micro-Unmanned Vehicles", Sensors and Actuators, vol. 80, p. 132-137, (2000).
Kolmogorov et al., "Smoothest Bearings: Interlayer Sliding in Multiwalled Carbon Nanotubes", Physical Review Letters, vol. 85 (No. 22), p. 4727-4730, (Nov. 2000).
Lambert et al., "Fabrication and Characterization of sub-3 nm Gaps for Single-Cluster and Single-Molecule Experiments", Nanotechnology, vol. 14, p. 772-777, (2003).
Lifshitz et al., "Thermoelastic Damping in Micro- and Nanomechanical Systems", Physical Review B, vol. 61 (No. 8), p. 5600-5609, (Feb. 2000).
Liu et al., "Arrays of Magnetic Nanoparticles Patterned via 'Dip Pen' Nanolithography", Advanced Materials, vol. 14 (No. 3), p. 231-234, (Feb. 2002).
Liu et al., "Highly Effective Metal Vapor Absorbents Based on Carbon Nanotubes", Applied Physics Letters, vol. 81 (No. 25), p. 4844-4846, (Dec. 2002).
Lozovik et al., "Nanomachines Based on Carbon Nanotubes", Physics Letters A, vol. 313, p. 112-121, (2003).
Mason et al., "Local Gate Control of a Carbon Nanotube Double Quantum Dot", Science, vol. 303, p. 655-658, (Jan. 2004).
Mckechnie, "rosular-rottlerin", Webster's New Twentieth Century Dictionary of the English Language, p. 1577, Simon and Schuster, no date provided.
Minett et al., "Nanotube Actuators for Nanomechanics", Current Applied Physics, vol. 2, p. 61-64, (2002).
Park et al., "Fabrication of Metallic Electrodes with Nanometer Separation by Electromigration", Applied Physics Letters, vol. 75 (No. 2), p. 301-303, (Jul. 1999).
Parthasarathy et al., "Electronic Transport in Metal Nanocrystal Arrays: The Effect of Structural Disorder on Scaling Behavior", Physical Review Letters, vol. 87 (No. 18), p. 186807, (Oct. 2001).
Piner et al., "'Dip-Pen' Nanolithography", Science, vol. 283, p. 661-663, (1999).
Poncharal et al., "Electrostatic Deflections and Electromechanical Resonances of Carbon Nanotubes", Science, vol. 283, p. 1513-1516, (Mar. 1999).
Regan et al., "Carbon Nanotubes as Nanoscale Mass Conveyors", Nature, vol. 428, p. 924-927, (Apr. 2004).
Roukes, "Nanoelectromechanical Systems", Solid-state Sensor and Actuator Workshop, p. 367-376, (Jun. 2000).
Sazonova et al., "A Tunable Carbon Nanotube Electromechanical Oscillator", Nature, vol. 431, p. 284-287, (Sep. 2004).
Syms et al., "Surface Tension-Powered Self-Assembly of Microstructures- The State-of-the-Art", Journal of Microelectromechanical Systems, vol. 12 (No. 4), p. 387-417, (Aug. 2003).
Tans et al., "Individual Single-Wall Carbon Nanotubes as Quantum Wires", Nature, vol. 386, p. 474-477, (Apr. 1997).
Terabe et al., "Ionic/Electronic Mixed Conductor Tip of a Scanning Tunneling Microscope as a Metal Atom Source for Nanostructuring", Applied Physics Letters, vol. 80 (No. 21), p. 4009-4011, (May 2002).
Tour et al., "Recent Advances in Molecular Scale Electronics", Annals of the New York Academy of Sciences, vol. 852, p. 197-204, (1998).
Wei et al., "Organized Assembly of Carbon Nanotubes", Nature, vol. 416, p. 495-496, (Apr. 2002).
Williams et al., "Torsional Response and Stiffening of Individual Multiwalled Carbon Nanotubes", Physical Review Letters, vol. 89 (No. 25), p. 255502, (Dec. 2002).
Williams et al., "Fabrication of Nanometer-Scale Mechanical Devices Incorporating Individual Multiwalled Carbon Nanotubes as Torsional Springs", Applied Physics Letters, vol. B2 (No. 5), p. 805-807, (Feb. 2003).

Wong et al., "Covalently Functionalized Nanotubes as Nanometre-sized Probes in Chemistry and Biology", Nature, vol. 394, p. 52-55, (Jul. 1998).

Yakobson et al., "Nanomechanics of Carbon Tubes: Instabilities Beyond Linear Response", Physical Review Letters, vol. 76 (No. 14), p. 2511-2514, (Apr. 1996).

Yu et al., "Controlled Sliding and Pullout of Nested Shells in Individual Multiwalled Carbon Nanotubes", Journal of Physical Chemistry B, vol. 104, p. 8764-8767, (2000).

Zettl, "Non-Carbon Nanotubes", Advanced Materials, vol. 8 (No. 5), p. 443-445, (1996).

Zettl Research Group, "Research Project: Nanoscale Electromechanical Systems (NEMS) Incorporating Carbon Nanotubes", http://physics.berkeley.edu/research/zettl/projects/NEMS.html, p. 1-2, (accessed 2004).

* cited by examiner

ROTATIONAL ACTUATOR OF MOTOR BASED ON CARBON NANOTUBES

CROSS-REFERENCE TO RELATED APPLICATIONS

This divisional patent application relates to and claims benefit of Provisional Patent Application Ser. No. 60/488,485, filed Jul. 18, 2003, and U.S. patent application Ser. No. 10/891,615, filed Jul. 15, 2004, now U.S. Pat. No. 7,053,520, both of which are hereby incorporated by reference in their entireties.

STATEMENT OF GOVERNMENTAL SUPPORT

This invention was made during work supported by U.S. Department of Energy under Contract No. DE-AC03-76SF00098. The government has certain rights in this invention.

REFERENCE TO SEQUENCE LISTING OR COMPACT DISK

None.

BACKGROUND OF THE INVENTION

1. Field of the Invention

The present invention relates to the field of nanomaterials such as carbon nanotubes and further to the field of molecular sized electromechanical devices.

2. Related Art

Nanostructures are of great interest not only for their basic scientific richness, but also because they have the potential to revolutionize critical technologies. The miniaturization of electronic devices over the past century has profoundly affected human communication, computation, manufacturing and transportation systems. True molecular-scale electronic devices are now emerging that set the stage for future integrated nanoelectronics (Ref 1).

Recently, there have been dramatic parallel advances in the miniaturization of mechanical and electromechanical devices (Ref 2). Commercial microelectromechanical systems now reach the submillimeter to micrometer size scale, and there is intense interest in the creation of next-generation synthetic nanometer-scale electromechanical systems (Refs 3,4). Such a nanometer scale electromechanical system is described below, demonstrating the construction and successful operation of a fully synthetic nanoscale electromechanical actuator/motor incorporating a rotatable metal plate, with a multi-walled carbon nanotube serving as the key motion-enabling element.

Although devices have been made by scaling down existing microelectromechanical systems (MEMS), the workhorse methods and materials of MEMS technology are not universally well suited to the nanoscale. Ultra-small silicon-based systems fail to achieve desired high-Q mechanical resonances owing to dominant surface effects and thermoelastic damping, and limitations in strength and flexibility compromise silicon-based high-performance actuator/motors (Refs 5, 6). On the other hand, the unusual mechanical and electronic properties of carbon (Ref 7) and boron-nitride (Ref 8) nanotubes (including favorable elastic modulus and tensile strength, high thermal and electrical conductivity, and low inter-shell friction of the atomically smooth surfaces (Refs 9, 10) suggest that nanotubes may serve as important NEMS-enabling materials if nanotubes can be engineered and modified to be part of a higher order system, i.e. as active components in a movable device.

Cumings et al. U.S. 2002/0070426 A1 discloses a method for forming a telescoped multiwall carbon nanotube ("MWNT"). Such a telescoped multiwall nanotube is shown in this publication to act as a linear bearing in an electromechanical system. That is, the walls of a multiwalled carbon nanotube are concentrically separated and are shown to telescope axially inwardly and outwardly. In *Science* 289:602-604 (28 Jul. 2000), a scientific publication related to the 2002/0070426 A1 patent publication, Cumings and Zettl describe a low friction nanoscale linear bearing, which operates in a reciprocal (i.e. telescoping) manner.

Den et al. U.S. Pat. No. 6,628,053 discloses a carbon nanotube device comprising a support having a conductive surface and a carbon nanotube, wherein one terminus of the nanotube binds to the conductive surface so that conduction between the surface and the carbon nanotube is maintained. The device is used as an electron generator.

Falvo et al. *Nature* 397:236-238 (Jan. 21, 1997) disclose studies involving the rolling of carbon nanotubes using atomic force microscope (AFM) manipulation of multiwall carbon nanotubes (MWCNT, termed in the paper "CNT"). No bearing properties are disclosed.

Minett et al. *Current Applied Physics* 2:61-64 (2002) disclose the use of carbon nanotubes as actuators in which the driving force is obtained from a deformation of the nanotube when a charge is applied. The authors, in their review also disclose the preparation of a suspended carbon nanotube across two metallic contacts growth of nanotubes across two metal contacts in a process that involved E-beam lithography and selective patterning.

Cumings et al. *Nature* 406:586 (Aug. 10, 2000) disclose techniques for peeling and sharpening multiwall nanotubes. These sharpened tubes are disclosed as having utility as biological electrodes, microscopic tips, etc.

Fraysse at al. *Carbon* 40:1735-1739 (2002) discloses carbon nanotubes that act like actuators. In concept, a SWNT may be disposed above a substrate and between a pair of metal-on-oxide layers. The nanotubes act as actuators through a cantilever effect achieved through longitudinal deformation of the nanotube.

BRIEF SUMMARY OF THE INVENTION

The present invention provides a nanoscale actuator/motor device, comprising: (a) a substrate; (b) at least one anchor pad on or extending from the substrate; (c) a nanotube mechanically and, optionally, electrically, connected to and extending from the anchor pad above the substrate to permit radial, i.e. rotational movement of an outer wall about an inner wall of the nanotube, which movement may be either freely rotating or torsional movement; (d) a rotor plate connected to an outer surface of the nanotube so as to move in connection with radial movement of the nanotube; and (e) at least one stator electrode disposed about the rotor plate to electrically interact therewith when charged with suitable voltage. The device may preferably comprise at least three stators disposed generally axially about the nanotube and close enough to interact with the rotor plate. The substrate may preferably comprise a silicon chip etched to define an area of rotation between the rotor plate and the substrate. That is, a block of inert material such as silicon, which is crystalline and doped to be conductive, is provided with a relatively insulating surface layer of $SiO_2$ upon which electrically isolated metal contacts may be formed. These contacts are used to create stators such as are known for use in electric motors having a rotor and stators.

The stator electrodes preferably comprise two opposed stator electrodes disposed on opposite sides of the multiwalled carbon nanotube (MWNT) and rotor plate and a third stator in the conductive silicon (e.g. single crystal or polycrystalline) substrate region. The opposed stator electrodes may further comprise a conductive material. Alternatively, the rotor plate or stators may be made of magnetic material. The electrodes and rotor plate interact in the illustrated device electrostatically; they may also interact with the rotor plate magnetically. The rotor and the stator(s) "electrically interact" in a general sense that includes both magnetic and electrostatic forces.

In a motor embodiment, the MWNT outer wall is separated from the anchor in a region between the rotor and the anchor to permit 360° of rotation of the MWNT outer wall relative to an inner wall. This can be accomplished by torquing the tube until the material connecting the outer wall breaks free on either side of the rotor. It was found that this technique produces a nanotube which is freely rotatable about the inner MWNT walls, while the MWNT is fixed in place at the anchors In operation, a voltage source is provided for delivering independent voltages to the stators in a predetermined sequence to cause rotation of the MWNT by sequential interaction between the rotor plate and successive stators. The voltage sources preferably comprise four independent voltage sources (or a single, four channel, voltage source), independently connected to the rotor plate and to the (preferably three) stator electrodes. The voltage source(s) may be alternated in opposite phases, in the case of the opposed stators, and in doubled frequency in the case of a 90 degree offset gate stator, in order to cause rotator plate to move fully through 360 degrees of rotation. Other sequences of stator charge are illustrated in FIG. 4.

In manufacturing, gold with a chromium adhesion layer was applied to the nanotube and, incidentally, to the silicon substrate. The electrodes, stator and rotor were formed by a patterning, evaporation and lift off process using a combination of techniques that, individually, are known in the semiconductor art. Thus, the substrate comprises a silicon oxide layer coated with metal that is patterned to define the rotor and at least one stator electrode. The stator electrodes comprise two opposed stator electrodes disposed on opposite sides of the rotor plate and a third stator on the surface below the rotor plate. Three dimensional features, i.e. anchor pads to secure the nanotube while permitting axial movement and electrodes in different planes, are provided by etching the $SiO_2$ layer.

One aspect of the present invention is a method of fabricating a nanoscale electric actuator/motor device having a nanotube attached to a rotor plate, said nanotube suspended at either end between anchor pads, comprising: (a) providing a conductive silicon substrate covered with a less conductive layer (which may be silicon dioxide, quartz, mica, etc.); (b) depositing an MWNT on the less conductive layer; (c) depositing e-beam resist onto the tube and the less conductive layer; (d) lithographically patterning the e-beam resist; (e) depositing a conductive metal layer on the less conductive layer; and (f) etching the substrate around the MWNT to leave raised anchor pads and at least one raised stator electrode covered with the conductive metal layer, with an etched away portion not covered with the conductive metal layer. A microscope such as an AFM or SEM is used to locate the MWNT's on the substrate and determine where to pattern the surrounding substrate in order to coat the appropriate rotor plate areas and stators, and where to etch away the silicon oxide contacting the nanotube and the rotor plate. Removal of silicon oxide is carried out by wet etching, such as with hydrofluoric acid. Prior to etching, the electrode pattern is established with electron beam resist which is removed from selective areas by shining an e-beam on the desired areas and then chemically removing the exposed resist with MIBK (methyl isobutyl ketone).

During the etching process that forms anchor pads and stators, undercutting caused by the fluid etchant removes material beneath the rotor. It also may be used to cause a collapse of the anchor pads and/or stator(s), so as to allow positioning of the stators at different positions. This allows further radial distribution of the stators about the nanotube. In this case device may have a stator electrode that is on a plane different from the rotor plate.

The present device is useful in higher order constructions, such as microfluidic devices, or electro-optic devices. In one such device, the rotor plate is contacted with a fluid contained in a channel on the substrate in order to propel the fluid or to direct it into or block it from a channel on the opposite side of the rotor plate. Alternatively, the rotor plate may be illuminated with light to be modulated, redirected, deflected or reflected, by axial movement of the rotor plate. The rotation can be used to impart signal information to an extremely small light beam, to cause the light to scan, or for other purposes. The rotor can be easily adapted to a desired shape or size by altering the lithographic process used to define it.

Finally, the present device may operate even at a significantly reduced atmospheric pressure, e.g. less than $10^{-5}$ torr.

DETAILED DESCRIPTION OF THE PREFERRED EMBODIMENT

I. Generalized Method and Apparatus

Figure 1:
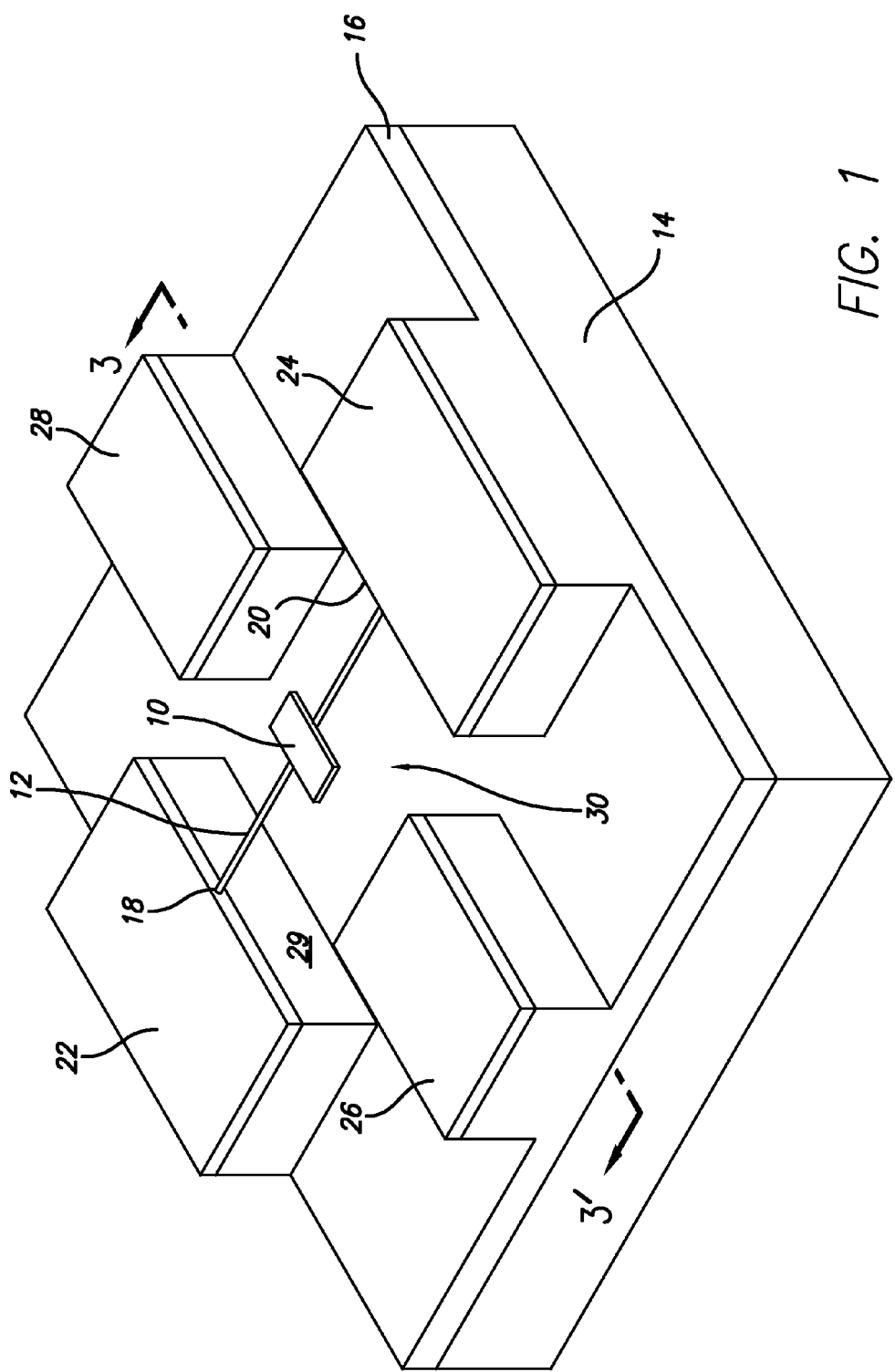
FIG. 1 is a perspective drawing of a rotational actuator/motor.

The present method and device utilizes a nanotube to which has been affixed a rotor plate that can be rotatably moved about the nanotube axis in a torsional, reciprocating manner (actuator) or, alternatively, can be rotated in a 360° spinning mode (motor). The axial movement is imparted by electrostatic forces between the rotor and at least one stator. These elements are electrically conductive and therefore generate electrical forces and fields that will cause movement of the rotor through attractive or repulsive forces, either electrostatically or magnetically. Alternatively, if the rotor is made magnetic (e.g. if the rotor is made of a ferromagnetic material such as iron), it can be accessed by magnetic fields. A spinning magnetic material generates an electric current and may be used as a generator.

The preferred rotatable element is a multiwalled carbon nanotube (MWNT). These nanotubes have a near perfect carbon tubule structure that resembles a sheet of $sp^2$ bonded carbon atoms rolled into a seamless tube. They are generally produced by one of three techniques, namely electric arc discharge, laser ablation and chemical vapor deposition. The arc discharge technique involves the generation of an electric arc between two graphite electrodes, one of which is usually filled with a catalyst metal powder (e.g. iron, nickel, cobalt), in a Helium atmosphere. The laser ablation method uses a laser to evaporate a graphite target which is usually filled with a catalyst metal powder too. The arc discharge and laser ablation techniques tend to produce an ensemble of carbonaceous material which contains nanotubes (30-70%), amorphous carbon and carbon particles (usually closed-caged ones). The nanotubes must then be extracted by some form of purification process before being manipulated into place for specific applications. The chemical vapor deposition process utilizes nanoparticles of metal catalyst to react with a hydrocarbon gas at temperatures of 500-900° C. A variant of this is plasma enhanced chemical vapor deposition in which vertically aligned carbon nanotubes can easily be grown. In these chemical vapor deposition processes, the catalyst decomposes the hydrocarbon gas to produce carbon and hydrogen. The carbon dissolves into the particle and precipitates out from its circumference as the carbon nanotube. Thus, the catalyst acts as a 'template' from which the carbon nanotube is formed, and by controlling the catalyst size and reaction time, one can easily tailor the nanotube diameter and length respectively to suit. Carbon tubes, in contrast to a solid carbon filament, will tend to form when the catalyst particle is ~50 nm or less because if a filament of graphitic sheets were to form, it would contain an enormous percentage of 'edge' atoms in the structure. Alternatively, nanotubes may be prepared by catalytic pyrolysis of hydrocarbons as described by Endo, et al., in *J. Phys. Chem. Solids,* 54, 1841 (1993), or as described by Terrones, et al., in *Nature,* 388, 52 (1997) or by Kyotani, et al., in *Chem. Mater.,* 8, 2190 (1996), the contents of all of which are incorporated by reference.

Other forms of nanotube may be used, so long as they have uniform mechanical properties, have multiple wall layers and are mechanically stable. Alternative forms of nanotubes (e.g. boron nitride) can be formulated with boron, nitrogen, or other elements; the key factors in selecting a nanotube are the nanoscale dimensions and the presence of multiple walls that can rotate relative to each other. Single walled nanotubes can also be used to provide a rotor support component for embodiments not involving free rotation, i.e. actuators, which have reciprocating radial movement.

The actuator/motor is essentially designed like an electric motor which has a plurality of electrically chargeable components in fixed relation to a rotating member on a nanotube axle. The overall size scale of the present actuator/motor is of the order of 300 nm. This will convey a sense of the size of the present device, wherein the diameter of the MWNT is approximately 5 to 100 nanometers and the gap between the anchor pads can be as small as 200 nm.

As described in detail below, the components of the actuator/motor are integrated on a silicon chip. That is, the stators are integral with the chip and the rotor plate is formed on the chip and when surrounding material is etched away from the chip. Low-level externally applied voltages precisely control the operation speed and position of the rotor plate. Repeated oscillations of the rotor plate between positions 180° apart, as well as rotations of 360°, have been demonstrated with no signs of wear or fatigue. Unlike existing chemically driven bio-actuators and bio-motors, the present fully synthetic nanometer-scale electromechanical system (NEMS) actuator/motor is designed to operate over a wide range of frequency, temperature, and environmental conditions, including high vacuum and harsh chemical environments.

FIG. 1 shows the conceptual design of the present device. The rotational element, rotor plate 10, a solid rectangular metal plate serving as a rotor plate, is attached transversely to a suspended support shaft 12. The suspended support shaft 12 is a nanotube, preferably a multiwalled carbon nanotube (MWNT) prepared as described above and deposited on a silicon substrate 14 having a silicon oxide layer 16 on top. The support shaft ends 18, 20 are embedded in electrically conducting anchors (22, 24) that rest on the oxidized surface 16 of silicon chip 14. The rotor plate assembly is surrounded by three fixed stator electrodes: two 'in-plane' stators (S1, S2), 26, 28 are horizontally opposed and rest on unetched portions of the silicon oxide surface 16, and the third 'gate' stator (S3) is buried beneath the etched surface (indicated at 30). Four independent (d.c. and/or appropriately phased a.c.) voltage signals, one to the rotor plate and three to the stators (V1, V2, V3 and V4) can be applied to control the position, speed and direction of rotation of the rotor plate. The nanotube 12 serves simultaneously as the rotor plate 10 support shaft and the electrical feed through to the rotor plate; most importantly it is also the source of rotational freedom.

It should be noted that surfaces shown as planar and perpendicular to the top of the substrate are in fact curved, and undercut the top surface. This occurs during the etching step, so that the conductive layer 22 hangs over the substrate. That is, surfaces shown as vertical planar surfaces in FIG. 1, such as surface 29, are in fact concave. In the case of the rotor plate 10, the substrate has been completely undercut. This undercutting can also be used to create differences in height as, e.g. between the stators 26, 28 and the anchors 22, 24, or between the two stators.

Figure 2:
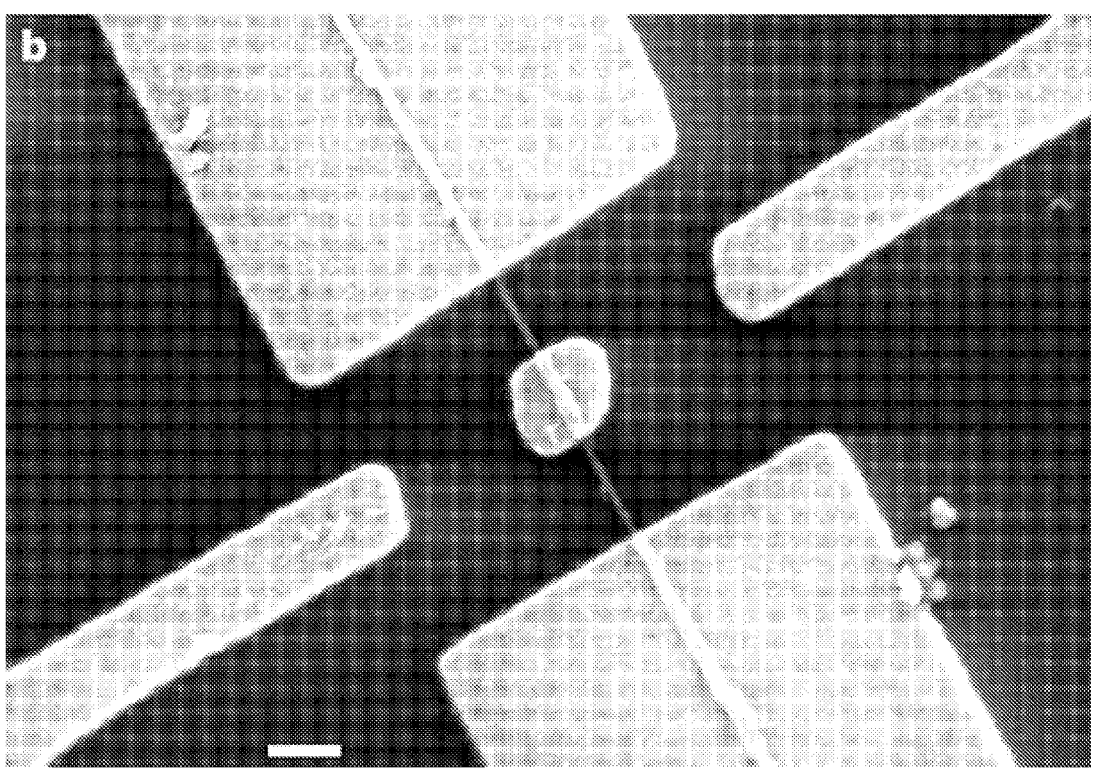
FIG. 2 is a top view electron micrograph of the rotational actuator/motor of FIG. 1 prior to etching.

FIG. 2 shows a scanning electron micrograph illustrating an actuator/motor device prior to etching. While the components are not numbered in the photograph, it is plain that they correspond to the structures illustrated in FIG. 1. The scale bar in the lower left portion of the scanning electron micrograph is 300 nm long and approximates the rotor plate width (transverse to the support). Typical rotor plate dimensions were 250-500 nm on a side.

II. Construction of the Device

A. MWNT's

MWNTs were synthesized by the standard arc technique as described in Ebbesen et al. U.S. Pat. No. 5,641,466 issued Jun. 24, 1997, hereby incorporated by reference to describe a method for large-scale synthesis of carbon nanotubes. The technique that was used is also reported in the *Nature* publication of reference (11). In an inert gas at a pressure of 200-2500 torr, an arc discharge is made between two carbon rod electrodes by application of a suitable AC or DC voltage (e.g. about 18 V) to thereby produce a carbon plasma. The electric current is about 50-100 A. As the result a carbon deposit forms on the end of one of the two carbon rods, and a core part of the carbon deposit contains a large amount of carbon nanotubes. This core part can easily be separated from a shell part in which no carbon nanotubes exist. Usually carbon nanotubes occupy more than 65 wt % of the core part of the deposit, and the nanotubes coexist with some (less than 35 wt %) carbon nanoparticles which are nanometer-scale carbon particles with polyhedral cage structures. Sometimes a small amount of amorphous carbon also coexists.

B. Doped Silicon Substrate

The present device was formed by the deposition of various layers and components onto a crystalline silicon chip. Degenerately doped silicon substrates were covered with 1 µm of thermally grown $SiO_2$. Pre-patterned alignment marks were placed on the substrate by standard lithographic techniques and were located a fixed distance apart for later reference.

The substrate is comprised of layers of silicon and silicon oxide. In processing, materials are deposited for the formation of the electrodes and the rotor plate, as described and shown next in connection with FIG. 3. Silicon was chosen because photolithographic, etching, and other techniques for its manipulation are readily available. Other inert materials that can be physically shaped could also be used for the present actuator/motor, such as plastic polymer or glass. Material; such as used in the resist could also be used C. Deposition and Etching The actuator/motor components (in-plane rotor plate, in-plane stators, anchors, and electrical leads) were then patterned in the substrate comprising the $SiO_2$ using electron beam lithography.

Figure 3A:
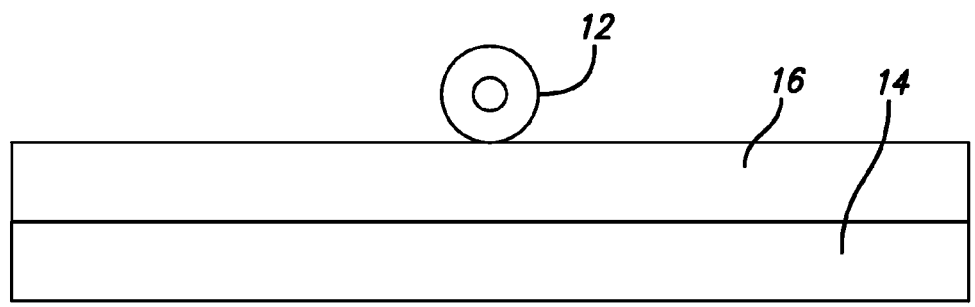
FIG. 3A-F is series of schematic drawings showing the present fabrication process.

FIG. 3A-F represents an end view taken along line 3-3' in FIG. 1. For purposes of illustration, a single MWNT is shown attached to the substrate, and the electrode behind the rotor plate is not shown. Referring now to FIG. 3A, the nanotube (e.g. an MWNT) 12 suspended in 1,2-dichlorobenzene was deposited on the above-described substrate, comprising a silicon chip 16 coated with silicon oxide 16. The MWNT's were located with respect to the pre-patterned alignment marks on surface 16 using an atomic force microscope (AFM) or a LEO 1550 scanning electron microscope (SEM). In this way, the subsequently described steps could be accurately positioned around the selected nanotube(s).

Figure 3B:
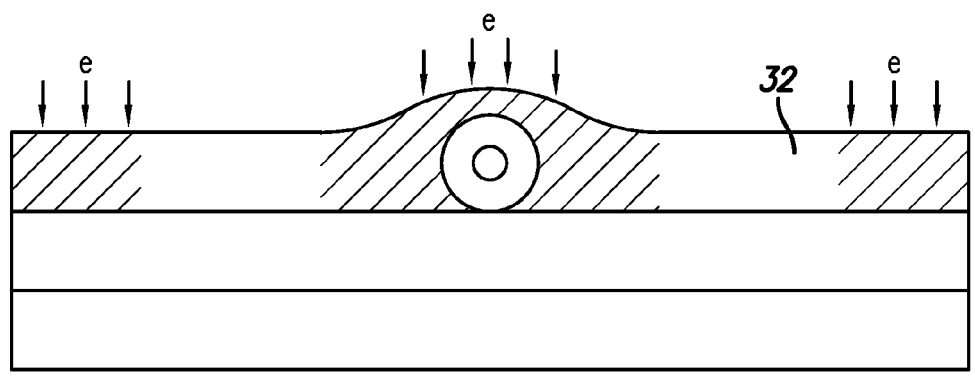

As shown in FIG. 3B the MWNT 12 on the $SiO_2$ and the $SiO_2$ were coated with a layer of e-beam resist 32. In adding layer 32, a single layer of electron beam resist (polymethyl methacrylate, 950,000 relative molecular mass, 5.5% in chlorobenzene) was spun on the substrate at 4,000 r.p.m. for 45 seconds, and subsequently baked in air at 150° C. for 2 hours.

Figure 3C:
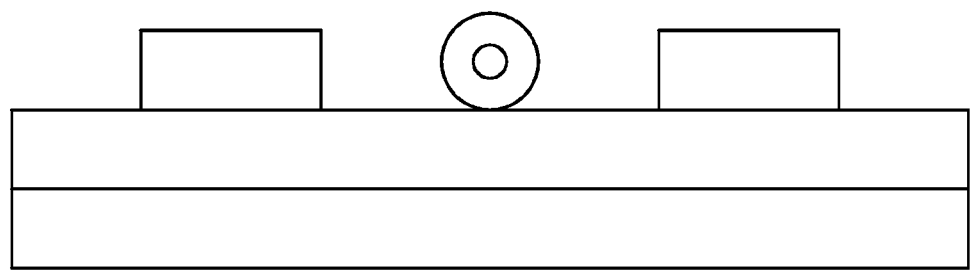

Next, as also shown in FIG. 3B, the resist was patterned using commercially available electron beam writing software, namely NPGS software (Nanometer Pattern Generating System, which may be obtained from available from Joe Nabity, Ph.D.JC Nabity Lithography Systems P.O. Box 5354 Bozeman, Mont. 59717 USA), loaded on a JEOL 6400 SEM (JEOL USA, Inc.). The JEOL-6400 with NPGS is a high-resolution, electron beam lithography system used for writing complex patterns in resists from the nanometer scale up to 5 mm. The striped regions in FIG. 3B represent areas of resist where the e beam struck and disrupted the resist so that it could be removed in subsequent steps. The electron beam resist was developed in methyl isobutyl ketone:isopropyl alcohol 1:3 for one minute, causing removal of the resist, as shown in FIG. 3C.

Figure 3D:
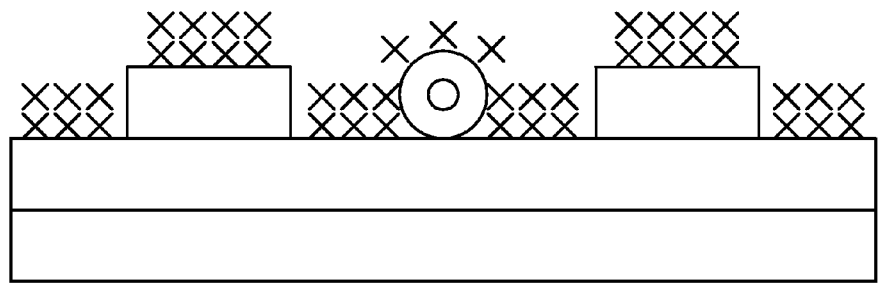
Figure 3E:
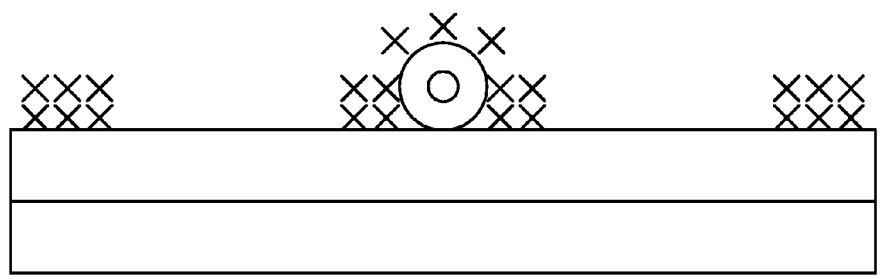

Next, as shown in FIG. 3D, chromium (10 nm), then gold (90 nm) was evaporated onto the nanotube and (incidentally) the surrounding area. The Cr layer improves adhesion of the gold that is used for electrodes and stators. Next, as shown in FIG. 3E, the resist that remained after the MIBK step (FIG. 3C), and the Au/Cr on top of it, were lifted off in acetone. The Cr/Au was subsequently annealed at 400° C. to ensure better electrical and mechanical contact between the Cr and the MWNT.

Figure 3F:
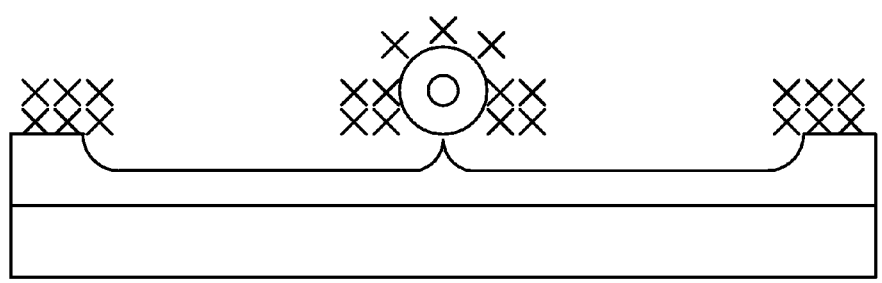

Then, as shown in FIG. 3F, an HF etch was used to remove roughly 500 nm of the $SiO_2$ surface 16 to provide clearance sufficient to permit the rotor plate to be rotated by 90° (and more). Note that the area under the rotor R is exposed to the HF from the sides through an undercutting process so that the Au/CR attached to the nanotube is free of underlying $SiO_2$. That is, in FIG. 3F, the tube and metal are resting on the anchors (not shown) that are into and above the plane of the drawing, along the axis of the nanotube.

The conducting Si substrate (typically used as the gate electrode in three-terminal nanotube field-effect devices (Refs. 12, 13) here serves as the gate stator, i.e. below the rotor plate.

III. Characterization and Operation

A. Torsional Spring (Actuator)

Initial actuator characterization was carried out in situ inside the LEO SEM. Applying voltages up to 50 V d.c. between the (slightly asymmetric) rotor plate and the gate stator (S3) generated a net torque sufficient to visibly rotate the rotor plate (up to 20° deflection). The rotor plate is slightly asymmetric in that one side extends further from the MWNT than the other. It should be noted that only one stator is necessary to create a torsional spring.

When the applied voltage was removed, the rotor plate would rapidly return to its original horizontal position. Using a finite analysis program (FEMLAB, a commercially available plug-in for MATLAB) and the actuator geometry together with the measured deflection and applied voltages, it was determined that a typical 'as produced' effective torsional spring constants was $10^{-15}$ to $10^{-12}$ N m. Evaluation of the MWNT shear modulus (assuming a continuum mechanics model [Ref 14]) necessitates knowledge of the outer radii of the nanotubes. The outer diameter of the MWNTs in the present devices was determined to within 20%. They ranged from 10 to 40 nm, which was consistent with high-resolution transmission electron microscopy (TEM) measurements of MWNTs from the same preparation batch. TEM imaging also showed the MWNTs to be of high structural quality, composed of concentrically nested cylindrical tubules with no obvious defects. A 10-nm-diameter MWNT with an effective length of 2 μm would have a shear modulus of 100 to 300 GPa. These ranges for torsional spring constant and shear modulus overlap those of more direct measurements employing a suspended MWNT subjected to torsional deflection via an atomic force microscope tip (Refs 15, 16). Although the actuator/motor devices just described have a number of extremely useful characteristics (including predicted torsional oscillator mechanical resonance frequencies of the order of tens to hundreds of megahertz), the strong torsional spring constant effectively prevents large low-frequency angular displacements. The torsional actuator/oscillator has significant applications that rely on the resonance frequency described. For example, it can act as a band pass filter to filter out certain frequencies going through the device. It can also be used to sense changes in fluid flow, when fluid is contacted to the rotor and the displacement of the rotor is measured. Because the nanotube is stiff, it has a high resonance frequency and can be useful in a variety of applications. The device will have a high quality factor, making them desirable as filters and for other applications utilizing the resonance frequency.

B. Rotator (Motor)

For large-displacement operation, including 360° rotation, the MWNT support shaft 12 (FIG. 1) was modified to exploit the intrinsic low-friction bearing behavior afforded by the perfectly nested shells of MWNTs (Refs. 9, 10, 17, 18). The modification comprises removing or compromising one or more outer MWNT shells in the region between the rotor plate 10 and the anchors 22, 24 (FIG. 1). Several in situ methods were used to achieve the modification while the device was in place in the in the LEO SEM, including reactive-ion etching, application of current through the nanotube to 'blow out' outer nanotube shells (Refs. 19, 20), and selective nanotube bond-damage induced by the SEM electron beam.

A particularly simple yet effective in situ MWNT modification method, and the one used on the devices to be described below, was to mechanically fatigue and eventually shear potions of the outer nanotube shells (between the rotor and the anchor) by successive application of very large stator voltages. We found that applied gate stator voltages of order 80 V d.c. would torque the outer nanotube shells past the elastic limit, eventually leading to partial or complete failure of the outer nanotube shells and a resulting dramatic increase in the rotational freedom of the rotor plate. In the 'free' state, the rotor plate was still held in position axially by the intact nanotube core shells, but could be azimuthally positioned, using an appropriate combination of stator signals, to any arbitrary angle between 0° and 360°. Once so positioned, the rotor plate nominally remained in place even with all stator voltages reduced to zero, eventually drifting to a vertical (0° or 180°) position only under the charging influence of the SEM imaging electron beam.

Other methods to separate the outer shell and permit free rotation could also be used. For example, the outer shell of the MWNT could be fractured using current passing through the nanotube. Or, a reactive ion etch could be used to break away outer walls.

In addition, partial breakage of an outer wall could be accomplished using these techniques. This would be useful in the actuator embodiment in that it would result in a weaker torsional spring. It could be used to sense fluid flow or to achieve a lower resonance frequency. More than one nanotube can be used together to support the rotor plate. In this case, the nanotubes can be damaged so that some of the tubes are no longer intact.

To verify the operation of the device a series of still SEM images were recorded of an actuator/motor device in the free state, being 'walked' through one complete rotor plate revolution using quasi-static d.c. stator voltages. The stator voltages, never exceeding 5 V, were adjusted sequentially to attract the rotor plate edge to successive stators. By reversing the stator voltage sequence, the rotor plate rotation could be reproducibly reversed. These images may be viewed in the corresponding publication in *Nature* 424:408-410 (24 Jul. 2003) and accompanying on-line materials. The images verify the rotation of the rotor plate as described.

Finite frequency operation of the actuator/motor was also performed, using a variety of suitably phased a.c. and d.c. voltage signals to the three stators and rotor plate. In one simple operation mode, out-of-phase common-frequency sinusoidal voltages were applied to stators S1, S2, and S3, and a d.c. offset to the rotor plate R; that is, $S1=V_0 \sin(\omega t)$, $S2=V_0 \sin(\omega t+240°)$, and $S3=V_0 \sin(\omega t+120°)$, where $\omega$ is ½ of the frequency of rotation, and $R=-V_0$. In this design, the stators are slightly below the plane of the nanotube/rotor/anchors. This dislocation of the stators (26, 28 FIG. 1) was accomplished by under etching the stators. This slight mismatch allows the simple voltage scheme described here to work, although other voltage schemes can be used in other configurations. Using this drive sequence, one may reliably flip the rotor plate between the extreme horizontal (90° and 270°) positions. Although in principle very high frequency operation should be possible (restricted only by the stripline bandwidth of the leads and, ultimately, inertial effects of the rotor plate), our SEM image capture rate limited direct real-time observations of rotor plate oscillations to frequencies of typically several hertz.

Figure 4:
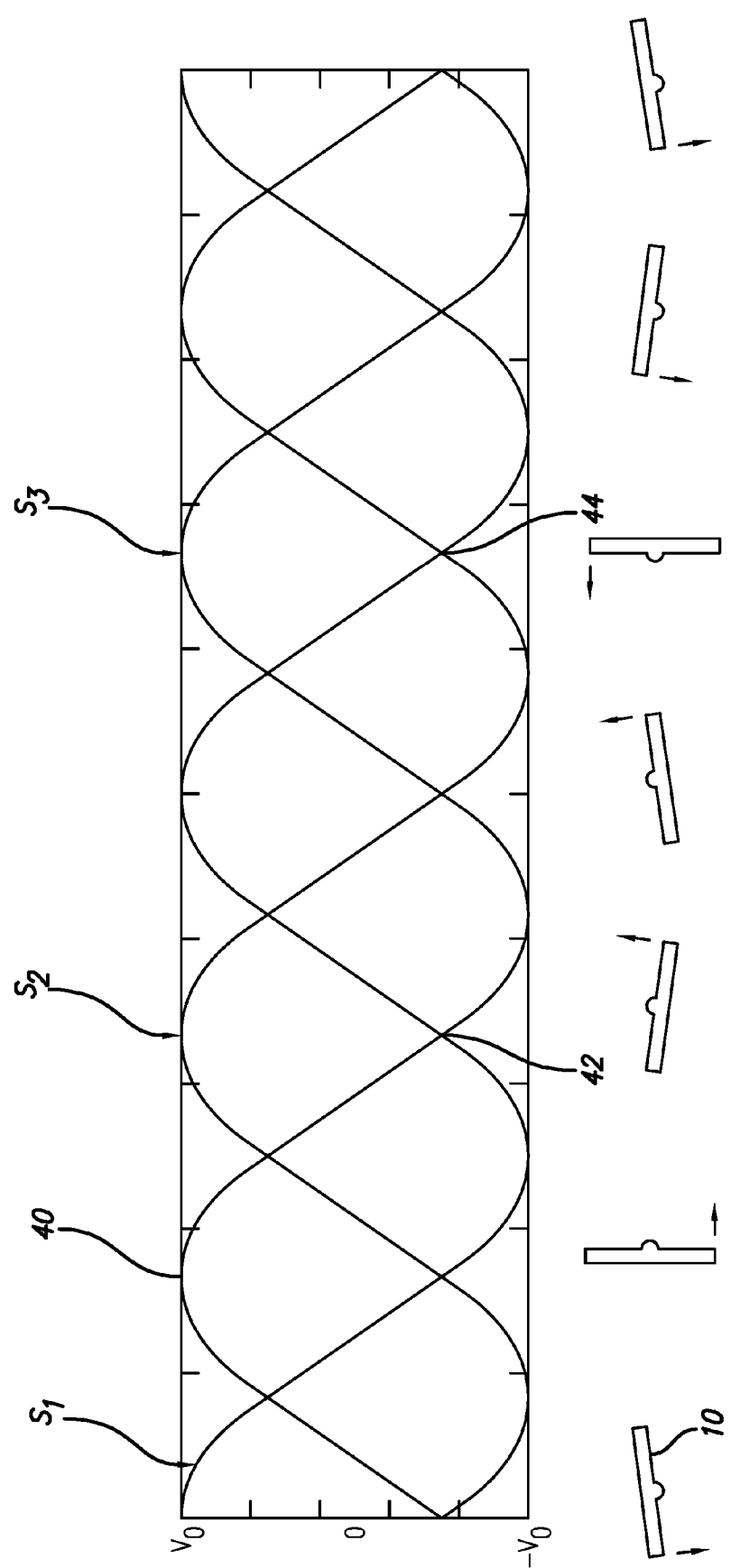
FIG. 4 is a graph showing applied voltages and movement of the rotor plate in response thereto.

Referring now to FIG. 4, suitable phased ac signals S1, S2, S3 in relation to the position of the rotor 10 are shown. The position of the rotor, as shown in the bottom row, changes relative to the combined effects of the voltages S1, S2 and S3, which follow the formulas described above. Standard voltage sources are used. Other configurations can be designed based on this example. It is simply necessary to place the stators in an arrangement so that they can affect the rotor in a range of rotational positions. In this case, when S1 is at a peak and S2 and S3 are between zero and a negative peak, the rotor is approximately at the default horizontal position (90°). At the peak positive S3 and near peak negative S2 and S3 voltages (shown at 40), the rotor has rotated 90° to the 180° position. When the S3 voltage returns to approximately ⅜ negative peak (shown at 42), the rotor, as illustrated, has advanced to the next horizontal position, 270°. At the peak positive S3 and positive S2 voltages, and near-negative S1 and S3 (shown at 44) voltages, the rotor has advanced to the 0° position and proceed from there to the 90° position, etc The transitions as described above (between the extreme horizontal positions) were recorded in digital video of the SEM images. The recording captured an a.c. voltage driven actuator/motor 'flipping' between the extreme horizontal positions (90° and 270°) in 33 milliseconds. Video samples are available in the corresponding on line publication corresponding publication in *Nature* 424:408-410 (24 Jul. 2003).

The transitions between positions could be made faster than the image video capture rate of 33 ms. Two images of the actuator/motor, recorded 33 ms apart, showed the rotor plate respectively in the 90° and 270° positions. Actuator/motors were rotationally driven in this fashion for many thousands of cycles, with no apparent wear or degradation in performance. In this configuration, the MWNT clearly serves as a reliable, presumably wear-free, NEMS element providing rotational freedom. This characterization was performed in a pressure of $10^{-6}$-$10^{-5}$ torr, although reliable operation at higher pressures is anticipated.

The present actuator/motor may be characterized as the first true MWNT-based NEMS device, in that it fully integrates electronic control and mechanical response. This distinguishes it from previous related MWNT-based mechanical devices which require relatively large and complex external control systems (such as piezo-driven manipulators) to achieve operation 15-18, 21.

IV. Applications

The present disclosure suggests that the present nanotube-based actuator/motors have a number of MEMS/NEMS applications. The rotor plate, when covered with metal, could serve as a mirror, with obvious relevance to ultra-high-density optical sweeping and switching devices (the total actuator/motor size is just at the limit of visible light focusing). In this case, a light source would be directed onto the rotor R from a position above the substrate. The light source could be any type of optical signal. The rotor plate could also serve as a paddle for inducing and/or detecting fluid motion in microfluidics systems, as a gated catalyst in wet chemistry reactions, as a bio-mechanical element in biological systems, or as a general (potentially chemically functionalized) sensor element. In a microfluidics application, the fluid would be channeled between an actuator and an anchor, and such projections would be etched in a way so as to define fluid impermeable channels. It is also possible that the charged oscillating metallic plate could be used as a transmitter of electromagnetic radiation.

While the foregoing device and its method of construction and operation has been described in reference to particular embodiments, many variations and embellishments are possible in view of the above teachings. Therefore, it is intended that the present invention not be limited to the specific embodiments described above, but rather to the scope of the appended claims.

REFERENCES

1. Tour, J. M. et al. Recent advances in molecular scale electronics. Ann. NY Acad. Sci. 852, 197-204 (1998).

2. Judy, J. W. Microelectromechanical system (MEMS): Fabrication, design and applications. Smart Mater. Struct. 10, 1115-1134 (2001).
3. Craighead, H. G. Nanoelectromechanical systems. Science 290, 1532-1535 (2000).
4. Roukes, M. L. in Tech. Digest of the 2000 Solid-State Sensor and Actuator Workshop (eds Bousse, L. & Schmidt, M.) 367-376 (Transducer Research Foundation, Cleveland, 2000)
5. Carr, D. W., Evoy, S., Sekaric, L., Craighead, H. G. & Parpia, J. M. Measurement of mechanical resonance and losses in nanometer scale silicon wires. Appl. Phys. Lett. 75, 920-922 (1999).
6. Lifshitz, R. & Roukes, M. L. Thermoelastic damping in micro- and nanomechanical systems. Phys. Rev. B 61, 5600-5609 (2000).
7. Iijima, S. Helical microtubules of graphitic carbon. *Nature* 354, 56-58 (1991).
8. Chopra, N. G. et al. Boron nitride nanotubes. Science 269, 966-967 (1995).
9. Charlier, J.-C. & Michenaud, J.-P. Energetics of multilayered carbon tubules. Phys. Rev. Lett. 70, 1858-1861 (1993).
10. Kolmogorov, A. N. & Crespi, V. H. Smoothest bearings: Interlayer sliding in multiwalled carbon nanotubes. Phys. Rev. Lett. 85, 4727-4730 (2000).
11. Ebbesen, T. W. & Ajayan, P. M. Large-scale synthesis of carbon nanotubes. *Nature* 358, 220-222 (1992).
12. Tans, S. J. et al. Individual single-wall carbon nanotubes as quantum wires. *Nature* 386, 474-477 (1997).
13. Bockrath, M. et al. Single electron transport in ropes of carbon nanotubes. Science 275, 1922-1925 (1997).
14. Yakobson, B. I., Brabec, C. J. & Bemholc, J. Nanomechanics of carbon tubes: Instabilities beyond linear response. Phys. Rev. Lett. 76, 2511-2514 (1996).
15. Williams, P. A. et al. Torsional response and stiffening of individual multiwalled carbon nanotubes. Phys. Rev. Lett. 89, 255202 (2002).
16. Williams, P. A. et al. Fabrication of nanometer-scale mechanical devices incorporating multiwalled carbon nanotubes as torsional springs. Appl. Phys. Lett. 82, 805-807 (2003).
17. Cumings, J. & Zettl, A. Low-friction nanoscale linear bearing realized from multi-walled carbon nanotubes. Science 289, 602-604 (2000).
18. Yu, M.-F., Yakobson, B. I. & Ruoff, R. S. Controlled sliding and pullout of nested shells in individual multi-walled carbon nanotubes. J. Phys. Chem. B 104, 8764-8767 (2000).
19. Cumings, J., Collins, P. G. & Zettl, A. Peeling and sharpening of multiwall nanotubes. *Nature* 406, 586 (2000).
20. Collins, P. G., Arnold, M. S. & Avouris, P. Engineering carbon nanotubes and nanotube circuits using electrical breakdown. Science 292, 706-709 (2001).
21. Poncharal, P., Wang, Z. L., Ugarte, D. & de Heer, W. A. Electrostatic deflections and electromechanical resonances of carbon nanotubes. Science 283, 1513-1516 (1999).

What is claimed is:

1. A method of rotating a nanotube, comprising:
(a) providing a multiwalled nanotube attached to a rotor plate, said multiwalled nanotube suspended at opposed portions between anchor pads on a substrate to permit rotational movement of the rotor plate without hindrance by the substrate, said multiwalled nanotube having an outer shell that is compromised in a region between the rotor plate and the anchor pad to permit additional rotational freedom of the rotor plate;
(b) providing at least two stator electrodes adjacent the rotor plate;
(c) applying out of phase voltages to the stator electrodes; and
(d) applying a dc voltage offset to the stator voltages to the rotor plate.

2. The method of claim 1 wherein step (b) comprises providing two stator electrode S1 and S2 on opposite sides of the nanotube and a stator electrode S3 approximately orthogonal to a line between S1 and S2; and
step (c) comprises applying out of phase, common frequency alternating voltages to stator electrodes S1 and S2.

3. The method of claim 2 further comprising the step of:
(e) applying a double frequency signal to electrode S3.

4. The method of claim 1 further comprising the step of contacting the rotor plate with a fluid contained in a channel on the substrate.

5. The method of claim 1 further comprising the step of contacting the rotor plate with light to be modulated by rotational movement of the rotor plate.

6. The method of claim 1 further comprising the step of contacting the rotor plate with light to be deflected by rotational movement of the rotor plate.

7. The method of claim 1 further comprising the step of reciprocally rotating the rotor plate at a resonance frequency determined by stiffness of the nanotube.

8. The method of claim 7 further comprising the step of modifying the stiffness of the nanotube by breaking portions of the nanotube.

9. The method of claim 1 further comprising:
(e) providing the substrate covered with a less conductive layer;
(f) depositing the nanotube attached to the rotor plate on the less conductive layer;
(g) depositing a conductive metal layer on the less conductive layer; and
(h) patterning the substrate around the nanotube attached to the rotor plate to leave raised anchor pads and at least one raised stator electrode covered with the conductive metal layer, with an etched away portion not covered with the conductive metal layer.

10. The method of claim 9 wherein the multiwalled nanotube is selected from the group consisting of carbon nanotubes and boron nitride nanotubes.

11. The method of claim 9 further comprising the step of breaking portions of the nanotube, thereby changing the stiffness of the nanotube.

12. The method of claim 9 further comprising the step of breaking portions of the nanotube, thereby permitting free rotation of the rotor plate.

13. The method of claim 9 comprising the step of:
breaking portions of a nanotube to permit greater torsional movement.

14. The method of claim 9 wherein said patterning comprises removing silicon oxide patterned on the substrate, carried out by wet etching.

15. The method of claim 14 wherein said patterning further comprises treating a coating of electron beam resist with an electron beam.

16. A method of rotating a nanotube, comprising:
(a) providing a nanotube attached to a rotor plate, said nanotube suspended at opposed portions between anchor pads on a substrate to permit rotational movement of the rotor plate without hindrance by the substrate, said nanotube and rotor plate are capable of 360° rotation relative to the substrate;
(b) providing at least two stator electrodes adjacent the rotor plate;
(c) applying out of phase voltages to the stator electrodes; and
(d) applying a dc voltage offset to the stator voltages to the rotor plate.

17. The method of claim 16 wherein step (b) comprises providing two stator electrode S1 and S2 on opposite sides of the nanotube and a stator electrode S3 approximately orthogonal to a line between S1 and S2; and step (c) comprises applying out of phase, common frequency alternating voltages to stator electrodes S1 and S2.

18. The method of claim 17 further comprising the step of:
(e) applying a double frequency signal to electrode S3.

19. The method of claim 16 further comprising the step of contacting the rotor plate with a fluid contained in a channel on the substrate.

20. The method of claim 16 further comprising the step of contacting the rotor plate with light to be modulated by rotational movement of the rotor plate.

21. The method of claim 16 further comprising the step of contacting the rotor plate with light to be deflected by rotational movement of the rotor plate.

22. The method of claim 16 further comprising the step of reciprocally rotating the rotor plate at a resonance frequency determined by stiffness of the nanotube.

23. The method of claim 22 further comprising the step of modifying the stiffness of the nanotube by breaking portions of the nanotube.

24. The method of claim 16 further comprising:
(e) providing the substrate covered with a less conductive layer;
(f) depositing the nanotube attached to the rotor plate on the less conductive layer;
(g) depositing a conductive metal layer on the less conductive layer; and
(h) patterning the substrate around the nanotube attached to the rotor plate to leave raised anchor pads and at least one raised stator electrode covered with the conductive metal layer, with an etched away portion not covered with the conductive metal layer.

25. The method of claim 24 wherein the nanotube is selected from the group consisting of single walled carbon nanotubes, multiwalled carbon nanotubes and boron nitride nanotubes.

26. The method of claim 24 further comprising the step of breaking portions of the nanotube, thereby changing the stiffness of the nanotube.

27. The method of claim 24 further comprising the step of breaking portions of the nanotube, thereby permitting free rotation of the rotor plate.

28. The method of claim 24 comprising the step of:
breaking portions of a nanotube to permit greater torsional movement.

29. The method of claim 24 wherein said patterning comprises removing silicon oxide patterned on the substrate, carried out by wet etching.

30. The method of claim 29 wherein said patterning further comprises treating a coating of electron beam resist with an electron beam.

31. A method of rotating a nanotube, comprising:
(a) providing a nanotube attached to a rotor plate, said nanotube suspended at opposed portions between anchor pads on a substrate to permit rotational movement of the rotor plate without hindrance by the substrate;
(b) providing at least two stator electrodes adjacent the rotor plate, wherein said providing comprises providing two stator electrode S1 and S2 on opposite sides of the nanotube and a stator electrode S3 approximately orthogonal to a line between S1 and S2;
(c) applying out of phase voltages to the stator electrodes, wherein said applying further comprises applying out of phase, common frequency alternating voltages to stator electrodes S1 and S2; and
(d) applying a dc voltage offset to the stator voltages to the rotor plate.

32. The method of claim 31 further comprising the step of:
(e) applying a double frequency signal to electrode S3.

33. The method of claim 31 further comprising the step of contacting the rotor plate with a fluid contained in a channel on the substrate.

34. The method of claim 31 further comprising further comprising the steps of: reciprocally rotating the rotor plate at a resonance frequency determined by stiffness of the nanotube, and modifying the stiffness of the nanotube by breaking portions of the nanotube.

35. The method of claim 31 further comprising:
(e) providing the substrate covered with a less conductive layer;
(f) depositing the nanotube attached to the rotor plate on the less conductive layer;
(g) depositing a conductive metal layer on the less conductive layer; and
(h) patterning the substrate around the nanotube attached to the rotor plate to leave raised anchor pads and at least one raised stator electrode covered with the conductive metal layer, with an etched away portion not covered with the conductive metal layer.

36. The method of claim 35 wherein the nanotube is selected from the group consisting of single walled carbon nanotubes, multiwalled carbon nanotubes and boron nitride nanotubes.

37. The method of claim 35 further comprising the step of breaking portions of the nanotube, thereby changing the stiffness of the nanotube.

38. The method of claim 35 further comprising the step of breaking portions of the nanotube, thereby permitting free rotation of the rotor plate.

39. The method of claim 35 comprising the step of:
breaking portions of a nanotube to permit greater torsional movement.

40. The method of claim 35 wherein said patterning comprises removing silicon oxide patterned on the substrate, carried out by wet etching.

41. The method of claim 40 wherein said patterning further comprises treating a coating of electron beam resist with an electron beam.

* * * * *